United States Patent
Kulp et al.

(10) Patent No.: US 11,183,719 B2
(45) Date of Patent: Nov. 23, 2021

(54) STORED ELECTRICAL ENERGY SOURCE HAVING AN EMERGENCY COOLING DEVICE

(71) Applicant: Bayerische Motoren Werke Aktiengesellschaft, Munich (DE)

(72) Inventors: Christian Kulp, Munich (DE); Sebastian Scharner, Tuerkenfeld (DE); Benjamin Weber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 79 days.

(21) Appl. No.: 16/375,020

(22) Filed: Apr. 4, 2019

(65) Prior Publication Data
US 2019/0237833 A1  Aug. 1, 2019

Related U.S. Application Data

(63) Continuation of application No. PCT/EP2017/072708, filed on Sep. 11, 2017.

(30) Foreign Application Priority Data

Oct. 5, 2016 (DE) ............... 10 2016 219 284.1

(51) Int. Cl.
*H01M 10/613* (2014.01)
*H01M 10/625* (2014.01)
(Continued)

(52) U.S. Cl.
CPC ..... *H01M 10/6557* (2015.04); *H01M 10/486* (2013.01); *H01M 10/613* (2015.04);
(Continued)

(58) Field of Classification Search
CPC ........... H01M 10/6557; H01M 10/486; H01M 10/647; H01M 10/6568; H01M 10/625;
(Continued)

(56) References Cited

U.S. PATENT DOCUMENTS 6,269,745 B1 * 8/2001 Cieplik ............... H01H 85/046
102/202.5
2010/0136391 A1  6/2010 Prilutsky et al.
(Continued)

FOREIGN PATENT DOCUMENTS

CN       1246958 A      3/2000
CN     103887516 A      6/2014
(Continued)

OTHER PUBLICATIONS

International Search Report (PCT/ISA/210) issued in PCT Application No. PCT/EP2017/072710 dated Oct. 20, 2017 with English translation (four (4) pages).
(Continued)

*Primary Examiner* — Muhammad S Siddiquee
(74) *Attorney, Agent, or Firm* — Crowell & Moring LLP

(57) ABSTRACT

An energy store has a plurality of electrical energy storage cells, which are connected electrically in series or parallel and are combined to form an energy storage module. Cooling plates are arranged between the energy storage cells and into which coolant or refrigerant can be introduced. A plurality of emergency switching devices are provided, each of which is associated with an energy storage cell and one or two cooling plates. The emergency switching devices allow the coolant or refrigerant to flow into the associated cooling plates only if a temperature of the associated energy storage cell exceeds a defined limit temperature.

11 Claims, 2 Drawing Sheets

(51) Int. Cl.
*H01M 10/63* (2014.01)
*H01M 10/6554* (2014.01)
*H01M 10/6557* (2014.01)
*H01M 10/6567* (2014.01)
*H01M 10/48* (2006.01)
*H01M 10/647* (2014.01)
*H01M 10/6568* (2014.01)

(52) U.S. Cl.
CPC ......... *H01M 10/625* (2015.04); *H01M 10/63* (2015.04); *H01M 10/647* (2015.04); *H01M 10/6554* (2015.04); *H01M 10/6567* (2015.04); *H01M 10/6568* (2015.04); *H01M 2200/10* (2013.01); *H01M 2220/20* (2013.01)

(58) Field of Classification Search
CPC ............ H01M 10/63; H01M 10/6554; H01M 10/6567; H01M 10/613; H01M 2200/10; H01M 2220/20; Y02E 60/10
See application file for complete search history.

(56) References Cited

U.S. PATENT DOCUMENTS

| | | | |
|---|---|---|---|
| 2011/0003185 A1 | 1/2011 | Kritzer | |
| 2011/0111269 A1* | 5/2011 | Tse | H01M 10/42 429/50 |
| 2011/0200860 A1* | 8/2011 | Brodie | H01M 10/6568 429/120 |
| 2011/0274958 A1 | 11/2011 | Iritani et al. | |
| 2012/0237805 A1* | 9/2012 | Abels | F28F 3/042 429/83 |
| 2012/0248881 A1* | 10/2012 | Chang | H02J 7/0016 307/87 |
| 2012/0282506 A1 | 11/2012 | Hohenthanner et al. | |
| 2013/0071720 A1* | 3/2013 | Zahn | H01M 10/60 429/120 |
| 2015/0072194 A1 | 3/2015 | Schmieder et al. | |
| 2015/0104686 A1 | 4/2015 | Brommer et al. | |
| 2015/0221995 A1 | 8/2015 | Robert et al. | |
| 2016/0204483 A1 | 7/2016 | Schilder et al. | |
| 2016/0365612 A1* | 12/2016 | Bradwell | H01M 10/6563 |
| 2017/0133658 A1* | 5/2017 | Zhang | H01M 10/425 |
| 2020/0076006 A1* | 3/2020 | Bradwell | H01M 10/39 |

FOREIGN PATENT DOCUMENTS

| | | |
|---|---|---|
| CN | 105789729 A | 7/2016 |
| DE | 10 2008 054 656 A1 | 6/2010 |
| DE | 10 2009 040 147 A1 | 3/2011 |
| DE | 10 2011 051 648 A1 | 1/2013 |
| DE | 10 2011 120 511 A1 | 6/2013 |
| DE | 10 2012 200 591 A1 | 7/2013 |
| DE | 10 2012 215 171 A1 | 2/2014 |
| DE | 10 2013 215 082 A1 | 2/2015 |
| DE | 10 2014 112 420 A1 | 3/2015 |
| DE | 10 2015 014 690 A1 | 7/2016 |
| DE | 10 2016 100 120 A1 | 7/2016 |
| DE | 10 2015 202 149 B3 | 8/2016 |
| EP | 0 892 450 A2 | 1/1999 |
| EP | 2 031 672 A1 | 3/2009 |
| EP | 2 284 425 A1 | 2/2011 |
| JP | 2008-251263 A | 10/2008 |
| JP | 2014-82069 A | 5/2014 |
| KR | 10-2016-0043761 A | 4/2016 |
| WO | WO 2011/073426 A1 | 6/2011 |
| WO | WO 2016/128180 A1 | 8/2016 |

OTHER PUBLICATIONS

German-language Written Opinion (PCT/ISA/237) issued in PCT Application No. PCT/EP2017/072710 dated Oct. 13, 2017 (six (6) pages).
German-language Search Report issued in counterpart German Application No. 102016219286.8 dated May 12, 2017 with partial English translation (13 pages).
International Search Report (PCT/ISA/210) issued in PCT Application No. PCT/EP2017/072708 dated Oct. 19, 2017 with English translation (five (5) pages).
German-language Written Opinion (PCT/ISA/237) issued in PCT Application No. PCT/EP2017/072708 dated Oct. 11, 2017 (four (4) pages).
German-language Search Report issued in counterpart German Application No. 102016219284.1 dated May 19, 2017 with partial English translation (13 pages).
International Search Report (PCT/ISA/210) issued in PCT Application No. PCT/EP2017/072291 dated Nov. 8, 2017 with English translation (four (4) pages).
German-language Written Opinion (PCT/ISA/237) issued in PCT Application No. PCT/EP2017/072291 dated Nov. 8, 2017 (six (6) pages).
German-language Search Report issued in counterpart German Application No. 10 2016 219 283.3 dated May 18, 2017 with partial English translation (14 pages).
Chinese Office Action issued in Chinese application No. 201780061121.9 dated Jul. 5, 2021, with English translation (Nineteen (19) pages).

* cited by examiner

STORED ELECTRICAL ENERGY SOURCE HAVING AN EMERGENCY COOLING DEVICE

CROSS REFERENCE TO RELATED APPLICATIONS

This application is a continuation of PCT International Application No. PCT/EP2017/072708, filed Sep. 11, 2017, which claims priority under 35 U.S.C. § 119 from German Patent Application No. 10 2016 219 284.1, filed Oct. 5, 2016, the entire disclosures of which are herein expressly incorporated by reference.

This application contains subject matter related to U.S. application Ser. No. 16/375,395, entitled "Stored Electrical Energy Source Having Cooling Plates Arranged between the Cells for Emergency Cooling," and Ser. No. 16/374,843, entitled "Electric Energy Store Comprising Energy Storage Cells, the Side Surfaces of which are Provided with a Pattern" filed on even date herewith.

BACKGROUND AND SUMMARY OF THE INVENTION

The invention relates to an energy store having an emergency cooling device, and to a motor vehicle having an energy store of said type.

For electric mobility, in the present state of the art, use is predominantly made of electric traction energy stores with a high voltage level. In the case of such energy stores or high-voltage stores, use is predominantly made of lithium-ion stores, for the design of which there are a variety of possibilities. In the technical field, the prevailing tendency in development is toward lithium-ion cells with ever-increasing energy density. The thermal stability of many lithium-ion cells is however inversely proportional to the stored energy quantity per unit of volume (energy density). In such high-voltage stores, an energy storage cell which experiences a cell-internal short circuit may exponentially release heat (a so-called thermal event). However, the amount of heat generated in the process is not sufficient to likewise incite a thermal event in the neighboring cell: as long as the energy density does not exceed 130-150 Wh/kg and the thermal stability limit is sufficiently high, a thermal event remains restricted to the cell with a cell-internal short circuit and does not propagate further into the store. In future energy stores, it is the intention to increase the energy density of energy storage cells to 200 Wh/kg and higher. The amount of heat in a thermal event in such an energy storage cell could then be sufficient to jump to adjacent cells. To prevent this, it is necessary to provide additional measures in the energy store in order to ensure the safety thereof even in this critical situation.

There is therefore a demand for safety precautions for future high-voltage stores which have a relatively high energy density.

It is an object of the invention to provide an energy store which satisfies more stringent safety requirements. This object is achieved by an energy store, as well as a motor vehicle having such an energy store, having a plurality of electrical energy storage cells which are connected electrically in series or in parallel and which are combined to form an energy storage module. Cooling plates are arranged between the energy storage cells and into which coolant or refrigerant can be introduced. A plurality of emergency switching devices are provided, each of which is assigned to one energy storage cell and to one or two cooling plates. The emergency switching devices permit an inflow of the coolant or refrigerant into the associated cooling plates only if a temperature of the respectively associated energy storage cell overshoots a defined threshold temperature.

According to one exemplary embodiment of the invention, an energy store is provided, having a plurality of electrical energy storage cells which are connected electrically in series or in parallel and which are combined to form an energy storage module; cooling plates which are arranged between the energy storage cells and into which coolant or refrigerant can be introduced; and a plurality of emergency switching devices, each of which is assigned to one energy storage cell and to one or two cooling plates. The emergency switching devices permit an inflow of the coolant or refrigerant into the associated cooling plates only if a temperature of the respectively associated energy storage cell overshoots a defined threshold temperature. This exemplary embodiment offers a safety measure in the event of a cell-internal short circuit. By means of the arrangement of the cooling plates between the energy storage cells, a jump of a thermal event from the defective energy storage cell to adjacent energy storage cells is prevented or at least slowed.

According to a further exemplary embodiment of the invention, the emergency switching devices of the energy storage cells which are equipped on both sides with cooling plates are assigned to said cooling plates arranged on both sides. Thus, the affected energy storage cell is cooled on both sides as a result of triggering of a single emergency switching device, and the jump of a thermal event to adjacent energy storage cells is slowed or prevented. Here, only the affected energy storage cell is cooled, which has the advantage that only a limited quantity of coolant has to be provided (weight saving), and the total quantity of this coolant is available for the affected energy storage cell.

According to a further exemplary embodiment of the invention, the emergency switching devices each have a fusible alloy which blocks the inflow of the coolant or refrigerant into the associated cooling plates below the threshold temperature and which permits the inflow above the threshold temperature. In particular, the blocking and enabling of the throughflow of coolant or refrigerant is effected exclusively by the fusible alloy in the form of a plug. By use of this passive design of the emergency cooling device, a minimum of additional weight is introduced into the energy store.

According to a further exemplary embodiment of the invention, the emergency switching device has a heating device which is adapted for warming the fusible alloy. In this way, the heating device can assist and possibly accelerate the melting of the fusible alloy.

According to a further exemplary embodiment of the invention, the fusible alloy includes silver, aluminum, bismuth, cadmium, copper, gallium, indium, antimony, lead and/or tin. These materials have suitable characteristics, for example melting temperature, for the desired usage situation.

According to a further exemplary embodiment of the invention, the fusible alloy is composed of one or more elements from the group comprising the following elements: silver, aluminum, bismuth, cadmium, copper, gallium, indium, antimony, lead and tin.

According to a further exemplary embodiment of the invention, the cooling plates have a channel structure for the distribution of the coolant or refrigerant, and said channel structure is formed in an elastic material.

According to a further exemplary embodiment of the invention, at inlets, which serve for the inflow of the coolant or refrigerant, of the cooling plates, there are provided nozzles which atomize the coolant or refrigerant. In this way, a good distribution of the coolant or refrigerant in the interior of the cooling plates is realized.

According to a further exemplary embodiment of the invention, the energy store has a coolant tank to which all of the emergency switching devices are connected and which supplies coolant exclusively to the emergency switching devices. In this way, only a small amount of coolant has to be provided for all of the cells. If the entire energy store were flooded with coolant, it would be necessary to provide a large amount of coolant.

According to a further exemplary embodiment of the invention, the cooling plates each have an outlet which releases the coolant or refrigerant from the respective cooling plate so as to impinge on respective cell connectors which electrically interconnect the energy storage cells.

The invention furthermore provides a motor vehicle having an energy store of said type.

Other objects, advantages and novel features of the present invention will become apparent from the following detailed description of one or more preferred embodiments when considered in conjunction with the accompanying drawings.

DETAILED DESCRIPTION OF THE DRAWINGS

According to the invention, an emergency cooling device is provided which, by means of a non-combustible coolant or refrigerant, can cool an energy storage cell which heats up exponentially. The emergency cooling device itself identifies whether and which cell has to be cooled, wherein no electrical supply is necessary.

Figure 1:
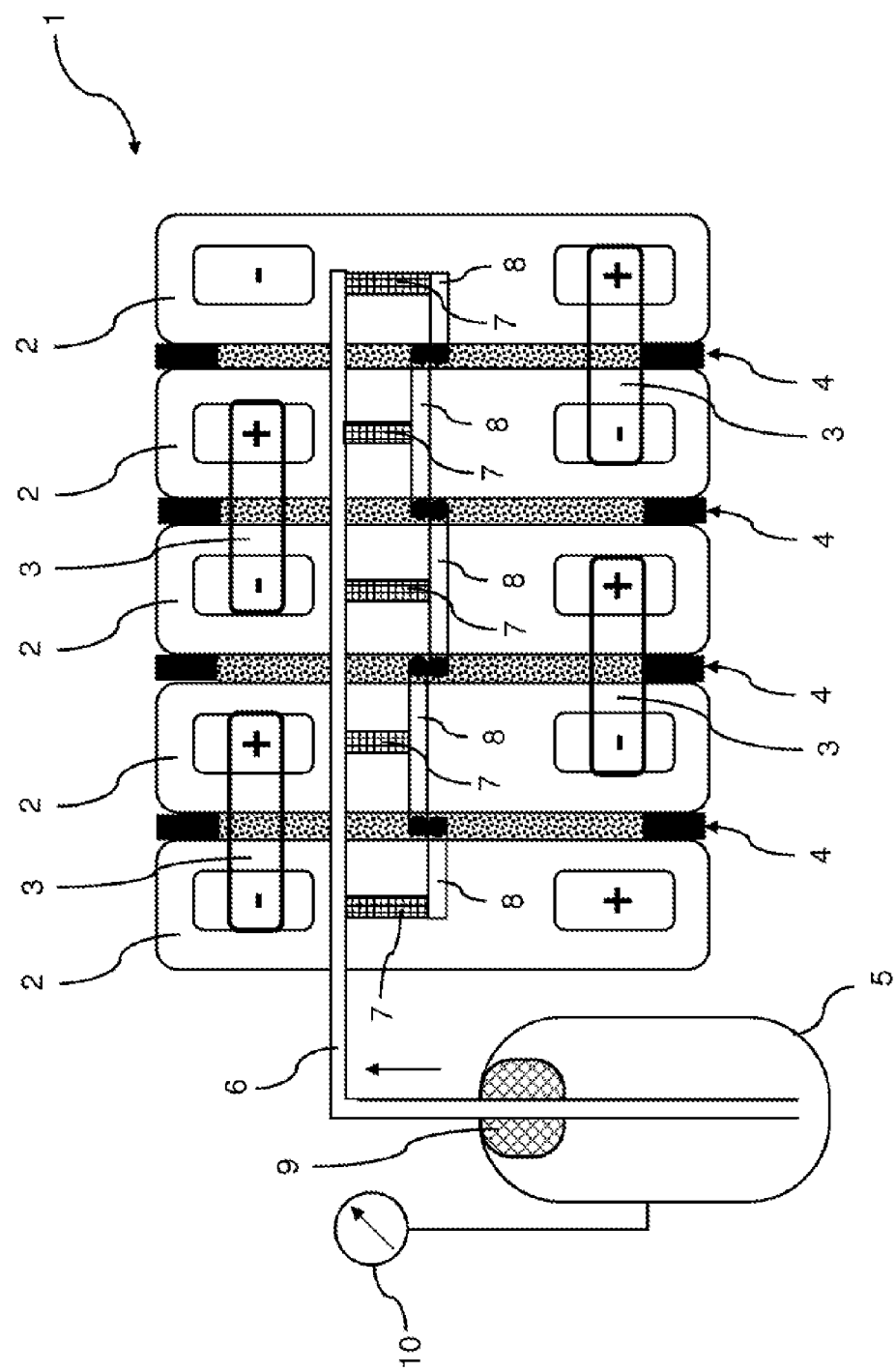
FIG. 1 is a schematic construction of an energy store according to an embodiment of the invention.

FIG. 1 shows a schematic construction of an electrical energy store 1 according to an embodiment of the invention. The electrical energy store 1 includes a plurality of electrical energy storage cells 2, which are preferably lithium-ion cells. The energy storage cells 2 are preferably so-called hard-case cells. These are prismatic cells with a torsionally resistant metal housing, in particular made of aluminum. This metal housing is not a composite material but rather is exclusively metal. The metal housing is closed by means of a laser welding process. Likewise known and contemplated for use with this invention would be so-called pouch cells, in the case of which the cell housing is formed from a foil composite material which is formed from a plurality of metal and plastics foils applied to one another. Two cell housing halves formed in this way are then adhesively bonded to one another, and sealed, using hot adhesive.

The plurality of energy storage cells 2 is combined as one energy storage module, wherein the individual energy storage cells 2 are electrically connected to one another in series or in parallel, preferably in series, by way of cell connectors 3, as illustrated in FIG. 1. The cell connectors 3 are designed as plate-shaped electrical conductor rails, which correspondingly interconnect the poles of the individual energy storage cells 2. In each case one cooling plate 4 is arranged between, in each case, two adjacent energy storage cells 2.

Coolant is stored in a coolant tank 5. As coolant, use may be made for example of water, $CO_2$ and/or a fluorinated ketone. Via a coolant feed line 6, the coolant can be fed directly to multiple emergency closures 7, that is to say the coolant tank 5 is connected directly to the emergency closures 7 via the coolant feed line 6. In each case one single emergency closure 7 is provided per energy storage cell 2, which emergency closure 7 blocks a throughflow of coolant during normal operation of the energy storage cells 2 and permits a throughflow of coolant in the event of a certain threshold temperature of the associated energy storage cell 2 being overshot. The emergency closures 7 are each in thermal contact with the associated energy storage cells 2, in particular are fastened to the energy storage cells 2. The emergency closures 7 are connected, in parallel with respect to one another, to the coolant tank 5, and thus form coolant lines 8 which branch off from the coolant feed line 6 and lead into the cooling plates 4. The path of the coolant feed line 6 between the emergency closures 7 and the coolant tank 5 is free from coolant consumers. Downstream of the emergency closures 7, the coolant lines 8 lead into the one or two cooling plates 4 which bear against the energy storage cell 2 assigned to the emergency closure 7. More specifically, the two outer energy storage cells 2 of the energy storage module are equipped with a cooling plate 4 only on their side facing toward the center of the energy storage module. Therefore, the coolant lines 8 of the two outer energy storage cells 2 lead directly from the emergency closures 7 to said cooling plates 4. The energy storage cells 2 (the internally situated energy storage cells) arranged between two energy storage cells 2 are in each case equipped with cooling plates 4 on both sides, wherein two adjacent energy storage cells 2 share the cooling plate 4 situated in between, or said cooling plate 4 is assigned to both energy storage cells 2. The coolant lines 8 of the internally situated energy storage cells 2 branch off downstream of the emergency closures 7, wherein in each case one branch leads to one of the two cooling plates 4 which bears against the energy storage cell 2 to which the respective emergency closure 7 is assigned. It is self-evidently also possible for the outer energy storage cells 2 to be equipped with cooling plates 4 on both sides, such that the outer energy storage cells 2 are constructed in the same way as the internally situated energy storage cells 2 and are equipped with the branching coolant lines 8.

If the temperature of a respective energy storage cell 2 now overshoots a defined threshold temperature, then the emergency closure 7 assigned to said energy storage cell 2 opens, such that coolant can flow from the coolant tank 5 via the now open coolant line 8 into the cooling plates 4 which bear against the respective energy storage cell 2. For this purpose, the coolant is stored under pressure in the coolant tank 5 and/or is forced out of the coolant tank 5 by an expandable pressure cartridge or by a propellant gas reservoir 9. The propellant gas reservoir 9, for example in the form of a propellant gas cartridge, would expand, and would force the liquid coolant out of the coolant tank 5, in the event of a release of pressure resulting from the opening of an emergency closure 7. It would likewise be possible for the coolant to be forced out of the coolant tank 5 by a propellant gas similarly to the principle of a spray can.

A pressure sensor 10 may be provided for monitoring the pressure level in the coolant tank 5. If the pressure level undershoots a particular setpoint value, it would be possible to conclude that a leak is present, for example in the coolant feed line 6, in one of the emergency closures 7 or in the coolant tank 5, and to output a corresponding warning.

To save weight and structural space, the coolant reservoir is ideally dimensioned for cooling one energy storage cell 2. Here, the cooling can act on each energy storage cell 2 in the energy store 1.

It would also be possible for the described emergency cooling to be incorporated into a refrigeration circuit which is provided for the climate control of a vehicle occupant compartment or for the cooling of vehicle components (for example the normal cooling of the energy store). The emergency cooling may accordingly be integrated into an existing energy store cooling arrangement, that is to say may be provided in addition to this, and may use the cooling medium (for example refrigerant) of the existing energy store cooling arrangement in an emergency situation.

The emergency closures 7 may be designed to be passive, active or passive with active assistance. In the case of the passive design of the emergency closure 7, the corresponding coolant line 8 is blocked with a fusible alloy, in particular in the form of a plug. The fusible alloy may for example have one or more of the following elements: silver, aluminum, bismuth, cadmium, copper, gallium, indium, antimony, lead and tin. The fusible alloy is preferably composed of one or more of the stated elements. Examples for suitable fusible alloys are: Bi58Sn42 Bi57Sn42Ag1; Bi58Sn42; In52Sn48 In50Sn50; Sn43Pb43Bi14; Bi50Pb25Sn25; In51Bi32Sn17; Bi50Pb28Sn22; Bi42Pb42Sn16; Bi52Pb32Sn16; Bi57Sn17In26; Bi44Pb25Sn25Cd6; Bi50Sn31Pb19; Bi50 . . . 35Pb35 . . . 28Sn30 . . . 22; Bi56.5Pb43.5; Bi60Cd40; Bi56Sn40Zn4.

As soon as the energy storage cell 2 becomes hot, the heat that is generated is transmitted to the associated emergency closure 7, in the interior of which the fusible alloy melts, and allows the coolant to pass, in the event of the threshold temperature being overshot. Said threshold temperature ideally lies at 100 to 130° C.

Alternatively, a glass ampoule with a solvent may be incorporated into the coolant lines 8. Above a particular temperature, the pressure of the solvent overshoots the pressure at which the ampoule bursts. In further embodiments, a polymer may be used, which melts. It is likewise possible for a bimetal to be used as a temperature switch, which, above a particular temperature, allows the coolant to pass.

Alternatively or in addition to the passive emergency closure, the emergency closure may also have an active temperature switch. This comprises a heating coil which is arranged around the fusible alloy. In this way, the emergency cooling of an energy storage cell 2 can be initiated actively by the battery management system. This is necessary for example if the fusible alloy melts only at a relatively high temperature, or if the introduction of heat by the energy storage cell 2 would be too slow. Whereas the passive emergency cooling device is always active and protects the energy store 1, the active emergency cooling device must be activated by a control unit. This necessitates relatively complex hardware, such that, for example, each energy storage cell 2 is equipped with a dedicated temperature sensor and each temperature switch is equipped with a heater. The emergency cooling device may also be designed to be simultaneously active and passive.

Figure 2:
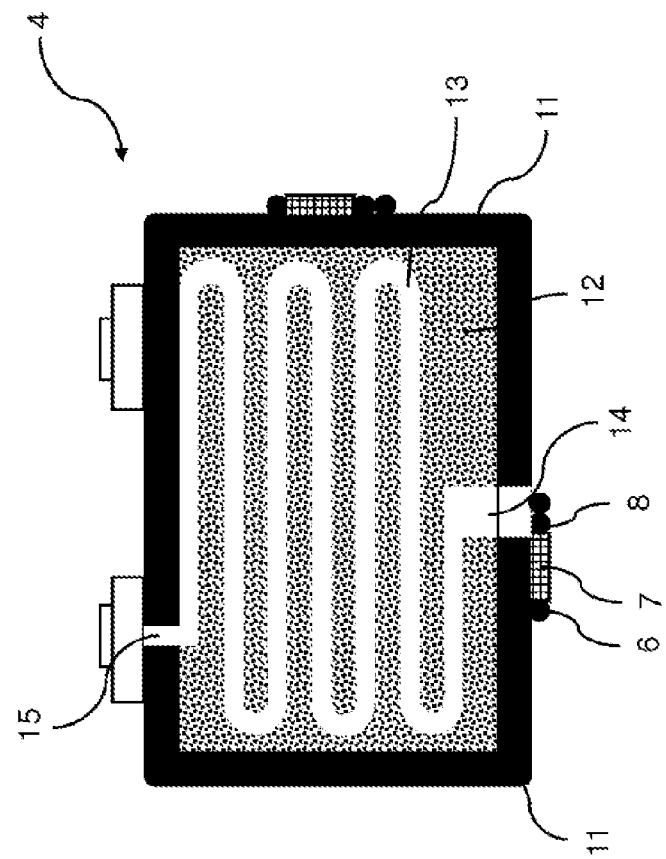
FIG. 2 schematically shows a cooling plate of the energy store according to an embodiment of the invention.

FIG. 2 schematically shows a cooling plate 4 of the energy store 1 according to an embodiment of the invention. Each cooling plate 4 comprises a support frame 11. This is preferably a rectangular frame, which is either formed as one piece and thus has a closed rectangular frame shape, or which forms said frame shape from multiple pieces, and is constructed for example from two halves. An elastic insert 12 is provided within the support frame 11. The outer circumference of the elastic insert 12 corresponds approximately to the inner circumference of the support frame 11. In the elastic insert 12, there are formed one or more channels 13 for distributing the coolant or refrigerant over the area of the cooling plate 4. It is preferable for a meandering channel 13 to be provided, as illustrated in FIG. 2, which extends in a meandering fashion from an inlet 14, which is connected to the associated coolant line 8, to an outlet 15. In other words, channel portions running substantially parallel are provided, wherein, as coolant flows through, the coolant has different flow directions in adjacent channel portions. In the exemplary embodiment illustrated, the emergency closures 7 are arranged under each energy storage cell 2, though they may also be arranged at the relatively short sides of the support frame 11.

The outlet 15 is positioned such that emerging coolant flows onto the cell connectors 3 and thus also cools these, in order to prevent or slow the transmission of a thermal event via the cell connectors 3 to adjacent cells.

As an alternative to the elastic insert 12, a nozzle may be situated in the support frame, by means of which nozzle the coolant can be injected in finely atomized form into the cavity formed by the support frame 11 (without elastic insert 12).

If the energy store 1 comprises a cooling arrangement for normal operational cooling, then the emergency cooling device may be integrated into said cooling system and may have a dedicated coolant and a dedicated piping arrangement.

Alternatively, the coolant and the piping arrangement of the normal energy store cooling arrangement may be jointly used for the emergency cooling device. In this case, the emergency closures 7 with the coolant tracts 8 are installed directly onto the existing energy store cooling arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy store, comprising:
   a plurality of electrical energy storage cells connected electrically in series or in parallel and combined to form an energy storage module;
   cooling plates arranged between the plurality of electrical energy storage cells, wherein coolant or refrigerant is introducible into the cooling plates; and
   a plurality of emergency switching devices, wherein each emergency switching device is assigned to one energy storage cell and to one or two cooling plates, and permits an inflow of the coolant or the refrigerant into the assigned one or two cooling plates only if a temperature of the assigned energy storage cell overshoots a defined threshold temperature.

2. The energy store as claimed in claim 1, wherein the emergency switching devices of the energy storage cells which are equipped on both sides with cooling plates are assigned to said cooling plates arranged on both sides.

3. The energy store as claimed in claim 1, wherein the emergency switching devices each have a fusible alloy which blocks the inflow of the coolant or the refrigerant into the assigned cooling plates below the threshold temperature and which permits the inflow above the threshold temperature.

4. The energy store as claimed in claim 3, wherein at least one emergency switching device has a heating device which is adapted for warming the fusible alloy.

5. The energy store as claimed in claim 3, wherein the fusible alloy has silver, aluminum, bismuth, cadmium, copper, gallium, indium, antimony, lead and/or tin.

6. The energy store as claimed in claim 5, wherein the fusible alloy is composed of one or more elements selected from the group comprising: silver, aluminum, bismuth, cadmium, copper, gallium, indium, antimony, lead and tin.

7. The energy store as claimed in claim 1, wherein the cooling plates have a channel structure for distributing the coolant or the refrigerant, and said channel structure is formed in an elastic material.

8. The energy store as claimed in claim 1, wherein at inlets, which serve for the inflow of the coolant or the refrigerant, of the cooling plates, nozzles are arranged which atomize the coolant or the refrigerant.

9. The energy store as claimed in claim 1, further comprising:
   a coolant tank to which all of the plurality of emergency switching devices are connected, wherein the coolant tank supplies coolant exclusively to the emergency switching devices.

10. The energy store as claimed in claim 1, wherein the cooling plates each have an outlet which releases the coolant or the refrigerant from the respective cooling plate so as to impinge on respective cell connectors which electrically interconnect the energy storage cells.

11. A motor vehicle comprising an energy store as claimed in claim 1.

* * * * *